(12) United States Patent
Sutton et al.

(10) Patent No.: US 8,424,807 B2
(45) Date of Patent: Apr. 23, 2013

(54) TRACK CONTAINER

(75) Inventors: David Alistair Sutton, Bristol (GB); Colin John West, Bristol (GB)

(73) Assignee: Airbus Operations Limited, Bristol (GB)

( * ) Notice: Subject to any disclaimer, the term of this patent is extended or adjusted under 35 U.S.C. 154(b) by 273 days.

(21) Appl. No.: 12/750,990

(22) Filed: Mar. 31, 2010

(65) Prior Publication Data

US 2010/0258674 A1 Oct. 14, 2010

(30) Foreign Application Priority Data

Apr. 8, 2009 (GB) .................... 0906074.0

(51) Int. Cl.
*B64C 9/14* (2006.01)
(52) U.S. Cl.
USPC ........ 244/123.1; 244/211; 244/212; 244/213; 244/214; 244/215
(58) Field of Classification Search ............... 244/123.1, 244/135 B, 135 R, 211–215
See application file for complete search history.

(56) References Cited

U.S. PATENT DOCUMENTS 2,779,702 A * 1/1957 Wilson et al. ................ 220/562
4,399,970 A * 8/1983 Evans ........................... 244/214
4,784,354 A * 11/1988 Tavano ..................... 244/135 B
2009/0127402 A1 5/2009 Jaggard et al.

FOREIGN PATENT DOCUMENTS

| EP | 0230681 A2 | 8/1987 |
| EP | 0291328 A2 | 11/1988 |
| EP | 0414531 A2 | 2/1991 |
| EP | 0501831 A1 | 9/1992 |

OTHER PUBLICATIONS

British Search Report for GB0906074.0 dated Jul. 28, 2009.

* cited by examiner

*Primary Examiner* — Tien Dinh
*Assistant Examiner* — Nicholas McFall
(74) *Attorney, Agent, or Firm* — Lowe Hauptman Ham & Berner, LLP

(57) ABSTRACT

An aircraft wing assembly comprising: a spar; a fuel tank; a track container which is attached to the spar and extends into the fuel tank; a track which extends through the spar and into the track container; and a high-lift device, such as a slat or flap, carried by the track. The track container comprises a stiffening element encased in an elastomeric sheath. The track container is manufactured by placing a stiffening element and elastomeric material together in a mould; and compressing and heating them to cure and shape the elastomeric material.

14 Claims, 5 Drawing Sheets

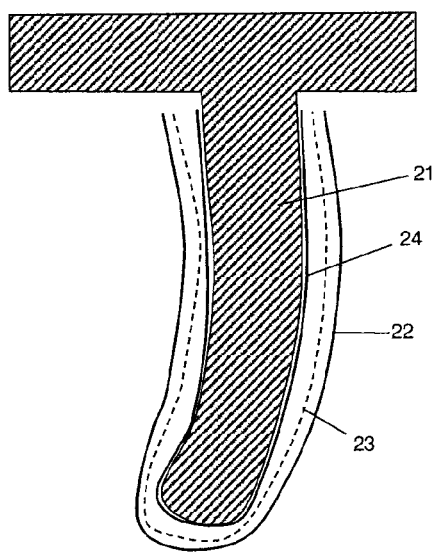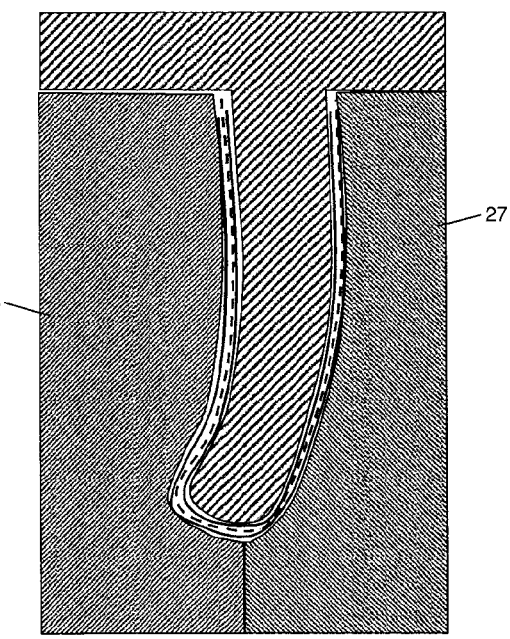
Figure 5
Figure 6

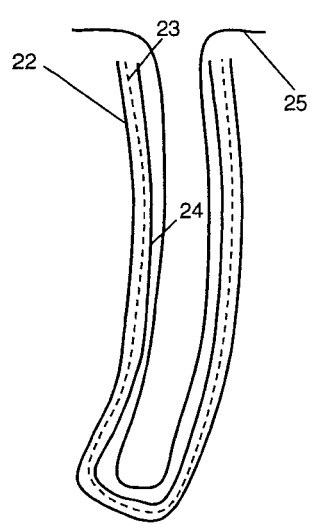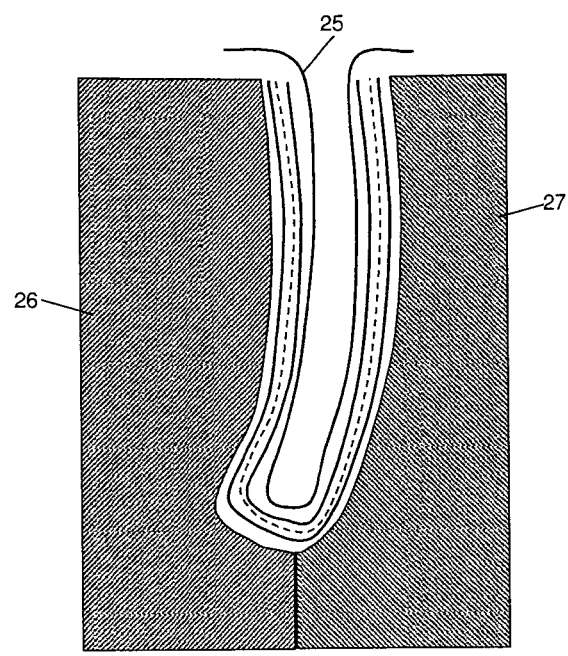
Figure 7
Figure 8

TRACK CONTAINER

RELATED APPLICATIONS

The present application is based on, and claims priority from, British Application Number GB0906074.0, filed Apr. 8, 2009, the disclosure of which is hereby incorporated by reference herein in its entirety.

FIELD OF THE INVENTION

The present invention relates to an aircraft wing assembly comprising: a spar; a fuel tank; a track container which is attached to the spar and extends into the fuel tank; a track which extends through the spar and into the track container; and a high-lift device, such as a slat or flap, carried by the track. The invention also relates to a track container for use in such an assembly, and a method of manufacturing a track container.

BACKGROUND OF THE INVENTION

Such track containers are conventionally made of metal and are known as "track cans". Forming the track can from metal results in a number of problems.

Firstly, metal is relatively dense and thus incurs a weight penalty. However it is difficult to form the can in a lighter material such as carbon-fiber composite due to its complex curved shape.

Secondly, the can must be superplastically formed, or manufactured from welded sections of metal sheet. These are complex and expensive processes.

Thirdly, it can be difficult to accurately produce a complex shape, and as a result the volume of the can may be higher than necessary, reducing the volume of the fuel tank.

Fourthly, metal is susceptible to galvanic corrosion, and requires surface treatment.

Fifthly, Titanium, which is typically used to form the slat track can, is an expensive material.

An object of the invention is to provide an improved track container in which one or more of these problems is removed or at least reduced.

SUMMARY OF THE INVENTION

A first aspect of the invention provides an aircraft wing assembly comprising: a spar; a fuel tank; a track container which is attached to the spar and extends into the fuel tank; a track which extends through the spar and into the track container; and a high-lift device carried by the track, wherein the track container comprises a stiffening element encased in an elastomeric sheath.

A second aspect of the invention provides a track container for containing a track of a high-lift device of an aircraft wing, the track container comprising a stiffening element encased in an elastomeric sheath.

A third aspect of the invention provides a method of manufacturing the track container of the second aspect of the invention, the method comprising placing a stiffening element and elastomeric material together in a mould; and compressing and heating them to cure and shape the elastomeric material.

The track container may further comprise a layer of conductive material on its exterior and/or interior surface.

BRIEF DESCRIPTION OF THE DRAWINGS

Embodiments of the invention will now be described with reference to the accompanying drawings, in which:

FIG. 5 shows various layers laid up on a male mould tool;
FIG. 6 shows the layers being compressed between the male mould tool and a female mould tool;
FIG. 7 shows various layers laid up on a male bladder;
FIG. 8 shows the bladder inserted in a female tool.

DETAILED DESCRIPTION OF EMBODIMENT(S)

Figure 1:
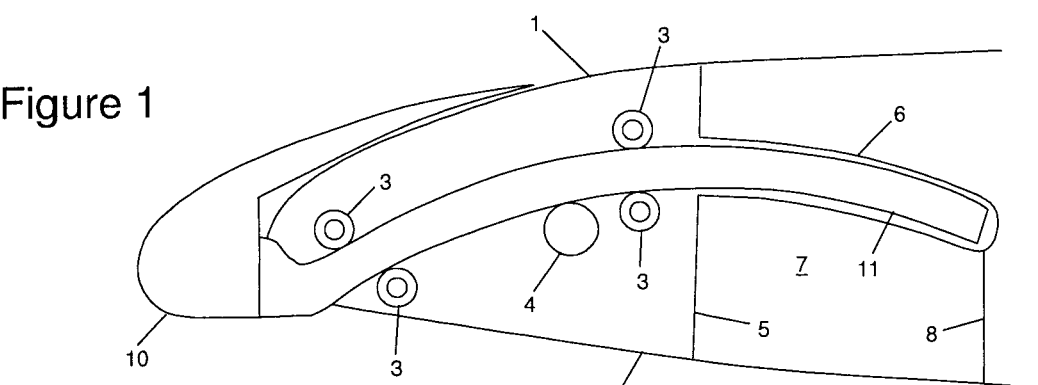
FIG. 1 is a side view of the leading edge of an aircraft assembly with the slat in its retracted position.
Figure 2:
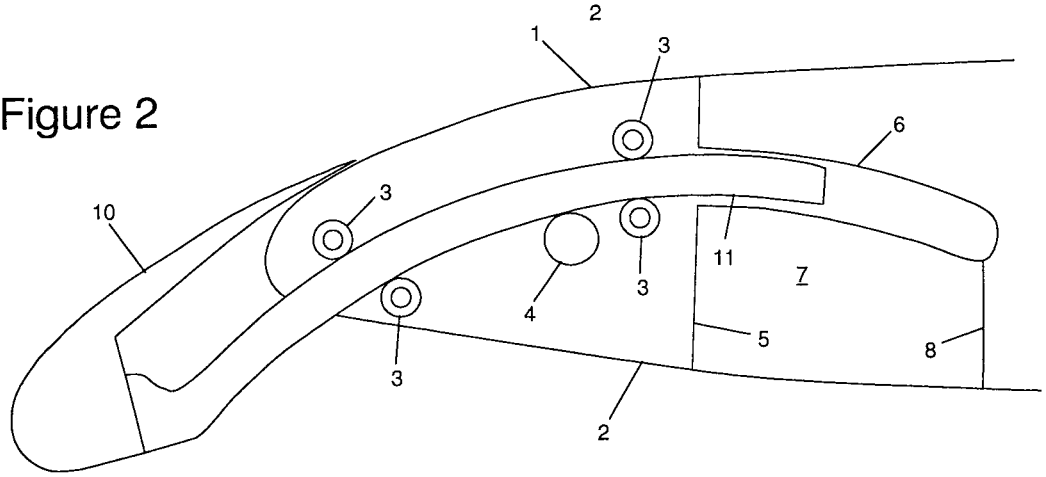
FIG. 2 shows the assembly with the slat in an intermediate position.

The leading edge of an aircraft wing assembly is shown in FIGS. 1 and 2. The wing has an upper surface; a lower surface 2 and a front spar 5 extending between them. A fuel tank 7 is located behind the front spar. A slat track container 6 is attached to the front spar and extends to the rear into the fuel tank 7. Any fluid which collects in the slat track container 6 can flow out via a drain pipe 8. Optionally the slat track container 6 may have a profiled internal surface which aids the removal of fluid by guiding it towards the drain pipe 8. A slat track 11 carrying a slat 10 extends through a hole in the front spar 5 and into the slat track container 6.

The slat track 11 follows a curved path which in the case of FIGS. 1 and 2 is approximately circular, although it more typically has a more complex curved shape. The slat track can be driven by a pinion gear 4 along a curved path defined by a set of rollers 3 between the retracted cruise position of FIG. 1 to an intermediate take-off and climb position shown in FIG. 2, and further to a fully extended landing position (not shown). As the slat track 11 moves, it slides in and out of the slat track container 6 as shown.

Figure 3:
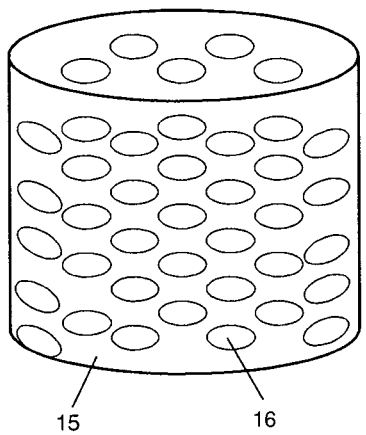
FIG. 3 shows a perforated stiffening element.
Figure 4:
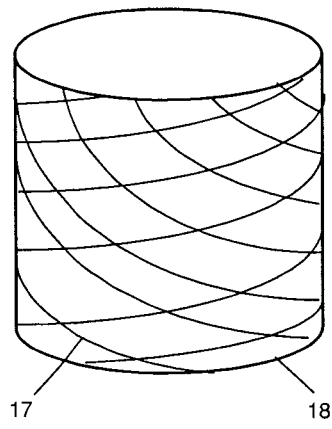
FIG. 4 shows a lattice stiffening element encased in an elastomeric sheath.

The slat track container comprises a stiffening element encased in an elastomeric sheath. FIG. 3 shows a section of an exemplary solid stiffening element 15 with holes 16. The stiffening element 15 may be formed from a composite material such as an epoxy-resin impregnated carbon-fiber, from a thermoplastic material such as glass-reinforced nylon, or from a metal such as titanium mesh impregnated with resin. FIG. 4 shows a section of a lattice stiffening element comprising a series of woven strands 17 formed from, for example, carbon, glass or ceramic material. The strands 17 are encased in an elastomeric sheath 18 which may be formed from any fuel resistant elastomer, such as polyurethane or fluorosilicone.

As well as encasing the stiffening element, the elastomeric material also impregnates the stiffening element by flowing into the holes 16 (in the case of FIG. 3) or between the strands 17 (in the case of FIG. 4) during the moulding process.

A first method of manufacture of the slat track container 6 is shown in FIGS. 5 and 6. An inner layer 24 of elastomeric material is laid onto a male mould tool 21, followed by a reinforcement element 23 and finally an outer layer 22 of elastomeric material. Optionally, different elastomeric materials may be used for the inner and outer layers—for instance a fuel resistant elastomer for the outer (fuel-facing) layer 22 and a hydraulic-fluid resistant material such as EPDM for the inner layer 24.

A two-part female mould tool 26, 27 is them closed onto the male tool 21 to compress the layers 22-24 as shown in FIG. 6. One or both of the mould tools is then heated which causes the elastomer to flow into the gaps or holes in the stiffening element, conform to the shape of the mould tools, and eventually cure. The cured container can then be removed by parting the mould tools 26, 27.

A second method of manufacture of the slat track container 6 is shown in FIGS. 7 and 8. First the layers 22-24 are laid onto a partially inflated bladder 25. The bladder is then placed in a mould cavity between a pair of tools 26, 27 as shown in FIG. 8. Then the bladder 25 is fully inflated to compress the layers 22-24. The mould tools 26, 27 are then heated which causes the elastomer to flow into the gaps or holes in the stiffening element, conform to the shape of the cavity, and eventually cure. The cured container can then be removed by parting the mould tools 26, 27.

Optionally, in order to increase manufacturing throughput, a number of bladders 25 or male tools 21 may be laid up at the same time and then placed one after the other in a single female tool.

Optionally a shim of conductive elastomer (that is, an elastomer loaded with conductive particles such as carbon black) may also be laid up on the exterior and/or interior of the container along with the layers 22-24 to enable static to be discharged.

Figures 9, 10:
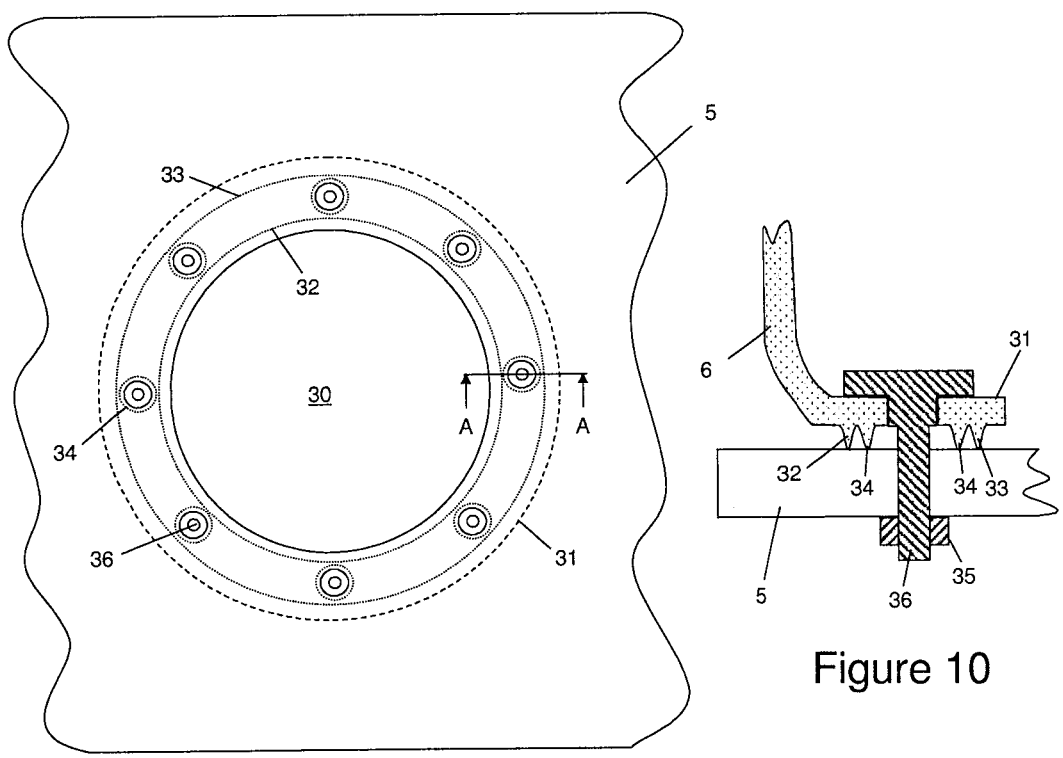
FIG. 9 is a front view of the spar showing the seal between the spar and the slat track container.
FIG. 10 is a sectional view taken along line A-A in FIG. 9.

FIGS. 9 and 10 show the seal between the slat track container 6 and the front spar 5. FIG. 9 is a view of the hole 30 in the front spar 5 through which the slat track extends, viewed from the front (that is, from the left hand side of FIG. 1). The slat track container 6 has a flange 31 with two large annular sealing ridges 32,33 which extend around the flange and eight small annular sealing ridges 34 each of which surrounds a respective fastener (in this case a nut 35 and bolt 36). As the nuts 35 are tightened onto the bolts 36, the sealing ridges 32-34 are compressed against the spar 5 to form a fuel tight joint.

Alternatively the slat track container 6 may be adhesively bonded to the front spar, or attached by clips which do not require holes to be formed in the slat track container 6.

The use of an elastomeric material in the slat track container provides the following advantages when compared with a welded metal slat track can:
- a complex shape can be formed by the moulding process which may be difficult by welding
- a weight saving is made because elastomer is less dense than metal. In the event that the slat track container is positively buoyant then the drain pipe 8 can also act as a tether
- cost savings are available because the container can be made in a single piece which requires less time to manufacture and inspect than a multi-part metal slat track can
- reduced material compatibility issues with regard to galvanic corrosion
- removes the requirement for complex welding
- removes corrosion and surface treatment issues
- greater flexibility with regards to the shape of the component, potentially reducing the volume of fuel tank lost by more closely following the path of the slat track
- no paint is required
- the elastomer is less susceptible to fatigue The embodiments described above relate to a slat track container on the leading edge of a wing, but similar principals can be applied in producing a flap track container for containing a flap track on the trailing edge of the wing.

Although the invention has been described above with reference to one or more preferred embodiments, it will be appreciated that various changes or modifications may be made without departing from the scope of the invention as defined in the appended claims.

The invention claimed is:

1. An aircraft wing assembly comprising: a spar; a fuel tank; a track container which is attached to the spar and extends into the fuel tank; a track which extends through the spar and into the track container; and a high-lift device carried by the track, wherein the track container comprises a stiffening element encased in an elastomeric sheath, and wherein the stiffening element encased in an elastomeric sheath is self-supporting.

2. The assembly of claim 1 wherein the track container further comprises a layer of conductive material on its exterior or interior surface.

3. An aircraft wing assembly comprising: a spar; a fuel tank; a track container which is attached to the spar and extends into the fuel tank; a track which extends through the spar and into the track container; and a high-lift device carried by the track, wherein the track container comprises a stiffening element encased in an elastomeric sheath, and wherein the assembly further comprises a tether attached to the track container and a wall of the fuel tank.

4. The assembly of claim 1 wherein the high-lift device is a slat or flap.

5. The assembly of claim 1 wherein the stiffening element is impregnated with elastomeric material.

6. The assembly of claim 1 wherein the elastomeric sheath comprises an inner layer which faces the track and an outer layer which faces the fuel.

7. The assembly of claim 6 wherein the inner and outer layers are formed from different elastomeric materials.

8. A track container for containing a track of a high-lift device of an aircraft wing, the track container comprising a stiffening element encased in an elastomeric sheath, and wherein the stiffening element encased in an elastomeric sheath is self-supporting.

9. The track container of claim 8 further comprising a layer of conductive material on its exterior or interior surface.

10. The track container of claim 8 wherein the elastomeric sheath comprises an inner layer on an inner side of the stiffening element and an outer layer on an outer side of the stiffening element.

11. The track container of claim 10 wherein the inner and outer layers are formed from different elastomeric materials.

12. A method of manufacturing the track container of claim 8, the method comprising placing a stiffening element and elastomeric material together in a mould; and compressing and heating them to cure and shape the elastomeric material.

13. An aircraft wing assembly comprising: a spar; a fuel tank; a track container which is attached to the spar and extends into the fuel tank; a track which extends through the spar and into the track container; and a high-lift device carried by the track, wherein the track container comprises a stiffening element encased in an elastomeric sheath, the track container has a flange with one or more annular sealing ridges which extend around the flange and are compressed against the spar to form a fuel tight joint, and the elastomeric sheath, the flange and the one or more annular sealing ridges are formed integrally as a single part from an elastomeric material.

14. A track container for containing a track of a high-lift device of an aircraft wing, the track container comprising a stiffening element encased in an elastomeric sheath, wherein the track container has a flange with one or more annular sealing ridges which extend around the flange, and the elastomeric sheath, the flange and the one or more annular sealing ridges are formed integrally as a single part from an elastomeric material.

* * * * *